Dec. 10, 1929.  H. H. BOYCE  1,739,285
MULTIPLE INDICATING TEMPERATURE RESPONSIVE DEVICE
Filed May 27, 1927

INVENTOR
HARRISON H. BOYCE
BY
ATTORNEY

Patented Dec. 10, 1929

1,739,285

UNITED STATES PATENT OFFICE

HARRISON H. BOYCE, OF JERICHO, NEW YORK

MULTIPLE-INDICATING TEMPERATURE-RESPONSIVE DEVICE

Application filed May 27, 1927. Serial No. 194,573.

This invention relates to devices for indicating the heat condition within the cooling system of an automotive internal combustion engine.

One object of this invention is to provide a device for indicating the heat condition within an automotive radiator which will indicate visually such heat condition by a plurality of separate indicating means.

Another object of this invention is to provide a device for indicating the heat condition within an automotive radiator which will indicate such heat condition by a movable indicia of a single color and by a movable indicia having a plurality of different colored areas.

Another object is to provide a simplified device for indicating the heat condition within an automotive radiator having a dual indication of such heat condition.

Another object of this invention is to provide a device for indicating the heat condition within an automotive radiator having a plurality of indicating elements each of which indicates such heat condition throughout substantially coextensive ranges.

Another object of this invention is to provide a device giving a pluarlity of indications of the heat condition within an automotive radiator, at least one of which indications is readable against light rays directed thereon from the rear or against a background of light rays from the headlights of an automotive vehicle upon which my device is mounted or from any other source.

Other objects and advantages of this invention will appear from the specification, claims, and appended drawings in which:—

Figure 1:
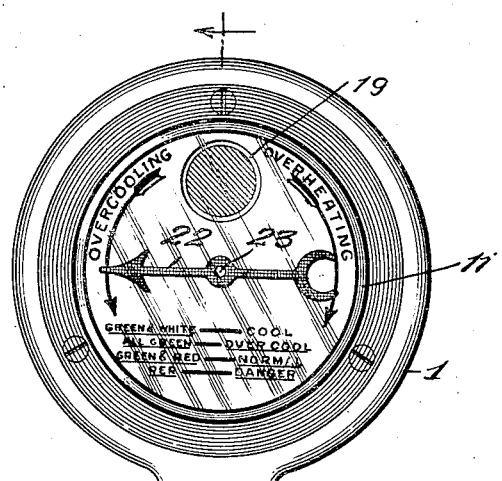
Fig. 1 is a front elevation of my device.

As is clearly shown in the drawings my device consists of a casing member 1 of the usual and customary outline and form from which projects a downwardly extending hollow stem 4 formed integral therewith. Near the upper end of the stem 4 and integral therewith a base or shoulder 5 is formed. The stem 4 is adapted to project thru an automotive radiator filler spout cap or closure device, not shown in the drawings, and to be secured thereto with the base 5 resting against the outer surface thereof by a nut 6 and lockwasher 7 cooperating with a threaded portion 8 on the stem 4.

Figure 2:
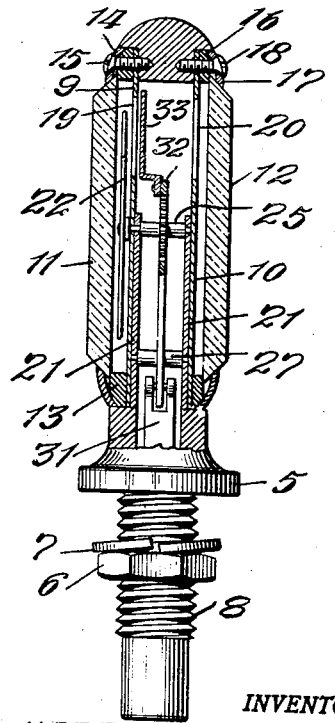
Fig. 2 is a cross-sectional view on the line 2—2 of Fig. 1.

The casing 1 is provided with front and back dials designated respectively by the numerals 9 and 10 and with front and back bezels numbered 11 and 12 respectively. The front bezel 11 is spaced from the dial 9 by a spacing ring 13 and the dial 9 spacer ring 13 and bezel 11 are held in place by a retainer ring 14 secured to the casing 1 by screws 15 as shown in Figs. 1 and 2. The rear bezel 12 is spaced from the rear dial 10, by a spacer ring 16 and the dial 10 spacer ring 16 and bezel 12 are all secured in place on the casing 1 by a retainer ring 17 and screws 18 in a manner similar to the front bezel, spacer ring, and dial. The front dial 9 is provided with an aperture 19 substantially opposite the hollow stem 4 and near the top of the said dial. The rear dial 10 is provided with an aperture 20 situated in alinement with the aperture 19 in the front dial 9. The purpose of these apertures will be set forth hereinafter.

A pair of upwardly extending arms 21, 21 are secured by any suitable means to the casing 1 adjacent the throat of the hollow stem 4. These arms extend substantially radially of the dials 9 and 10 to a point slightly beyond the centers thereof. As will be seen from Figure 2 one of the arms 21 lies along each dial.

An indicating pointer 22 is mounted in the space between the front bezel 11 and front dial 9 by securing the same to a shaft 23 passing thru an aperture in the front dial and alined bearing apertures in the arms 21, 21. I have shown the shaft 23 as mounted at the center of the dial 9 but I do not desire to limit myself to a central mounting.

A pinion 24 is secured to the shaft 23 between the arms 21, 21 by a hub 25. The hub 25 is of a length substantially equal to the space between the arms 21, 21 and thus prevents endwise movement of the shaft 23. The hub 25 may be secured to the shaft 23 by friction or in any other suitable manner. The pinion 24 meshes with a segmental rack member 26 mounted by a hub 27 on a pin 28 extending between and mounted in apertures in the arms 21, 21 adjacent the throat of the hollow stem 4.

The rack member 26 is provided with a forked portion 29 extending below the hub 27. A pin 30 of a thermostatic device 31 extending into the hollow stem 4 engages the forked portion 29 and therethru operates the rack member 26 upon changes in heat condition. Since the hollow stem 4 projects within the automotive radiator the thermostatic device 31 is subject to changes to heat condition within said radiator and the rack member will be operated in accordance with such changes.

Figure 3:
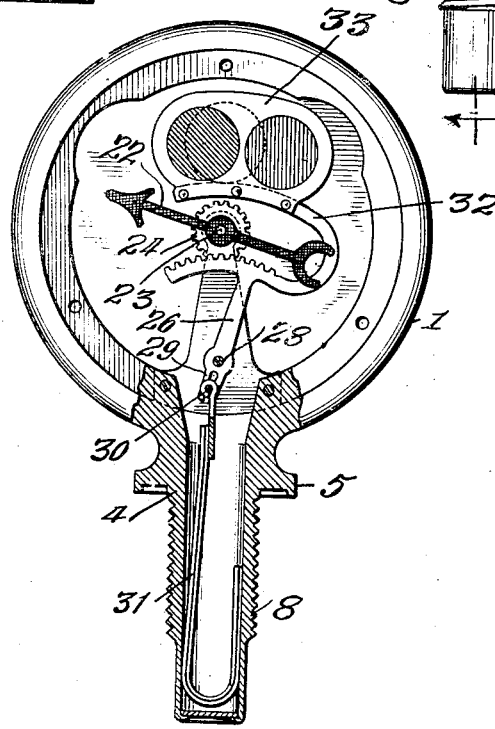
Fig. 3 is an elevation view with parts removed and partly in section to more clearly illustrate the invention.

An arm 32 is formed integral with or secured in any suitable manner to the member 26 and extends in a curve upwardly and then concentrically with the rack teeth on the member 26. As shown in Figures 2 and 3, the concentric portion of the arm 32 extends above the pinion 24 and below the apertures in the dials 9 and 10. Fixed to the concentric portion of the arm 32 is a member 33 of celluloid or other light penetratable material. This member 33 is offset, as shown in Fig. 2 to bring the same in close proximity to the aperture 19 in the front dial 9. It is obvious that the arm 32 might be offset to bring the member 33 close to the dial 9 instead of offsetting the said member if desired.

As has been hereinbefore stated the segmental rack member 26 is operated by changes in the heat condition within a radiator to which my device is attached. Due to these changes in heat condition the rack member 26 will pivot about the pin 28, thus rotating the pinion 24, shaft 23 and pointer 22 and also translating the member 33; thus bringing different portions of the said member before the aperture 19 in response to different heat conditions. In order to visually indicate the heat condition corresponding to a given position of the member 33, I have colored the area exhibited at certain heat conditions with distinctive colors such as red for a dangerous heat condition and green for an over-cool condition. These colors are preferably of a transparent or translucent dye, paint, lacquer, or varnish, but may be applied in any other suitable manner, as by inserts or affixed areas of the desired colors. While I have shown only two colored areas in the drawings, it is apparent that any number may be employed and further that the shape of the areas may be varied as found desirable.

In the drawings, I have illustrated the colored areas as a red and a green circle, the red circle entirely covering the aperture when a dangerous condition of overheating exists in the cooling system and the green circle entirely covering the aperture when the system is too cool for efficient operation. Heat conditions between these extremes will be indicated to the operator by the amount of each circle visible thru the aperture.

The purpose of the aperture 20 in the rear dial 10 is to facilitate the reading by day and by night of the indication presented at the aperture 19. As has been hereinbefore stated the member 33 is penetratable by light rays and as the colored areas are transparent or translucent the color and amount of colored areas presented before the aperture is easily readable against the background of light rays presented behind or thru the aperture 20 in the rear dial 10. These light rays may emanate from the headlight of the vehicle upon which my device is mounted, from approaching or passing vehicles or from other sources.

The front dial 9 may if desired bear a legend of the heat conditions corresponding to the various exhibited colors as shown in Fig. 1. This legend may be affixed in any suitable manner and also may show in addition to the names of the colors colored areas corresponding to the colors exhibited for the given heat condition. If found desirable these areas may also correspond to the shape of the area of the color exhibited.

In connection with the indication by the pointer 22 the dial 9 may be graduated in any desired manner and the various indications may also be designated by such words as Overheating, and Overcooling and the dial may also bear indicating arrows showing the direction of movement of the pointer 22 as the given condition becomes more aggravated. These designations may be replaced by such words as Danger, Driving range, Cool, etc., if found desirable.

At this point, I wish to call attention to the fact that the pointer and member 33 move in opposite directions upon a given heat change and thus attract the eye of the operator much more quickly than a one direction movement. The movement of the pointer together with a simultaneous change in the color or amount of color visible thru the aperture 19 also registers more forcibly on the operator's eye than either alone.

Further the movement of the pointer is rotary in character while the movement of the colored areas visible to the operator thru the aperture 19 is of a translatory nature. Such a combination of movements presents a marked contrast and immediately draws the attention of the operator of the vehicle.

Various changes in the construction of the embodiment illustrated in the drawings may be made without departing from the spirit of the invention, and I do not therefore desire to limit myself to the specific construction shown and described, but to interpret the invention broadly within the scope of the appended claims.

What I claim as my invention is:

1. In a device for indicating the heat condition within an automotive radiator, the combination of a heat responsive means, a plurality of visual indicating devices including an indicating pointer and a semaphore visible from the same side of the device, and means comprising connections between the pointer and the semaphore and the heat responsive means for enabling said heat responsive means to move the semaphore and pointer relative to each other.

2. In a device for indicating the heat condition within an automotive radiator, the combination of a heat responsive means and a plurality of visual indicating devices each of a different character operable thereby and visible from the same side of the device.

3. In a device for indicating the heat condition within an automotive radiator, the combination of a heat responsive means and a plurality of visual indicating devices one operable directly and the other indirectly by and under continuous control of said heat responsive means.

4. In a device for indicating the heat condition within an automotive radiator, the combination of a heat responsive means and a plurality of indicating devices of substantially coextensive range of indication operable thereby and visible from the same side of the device.

5. In a device for indicating the heat condition within an automotive radiator, the combination of a heat responsive means and a plurality of visual indicating devices each of a different character and of substantially coextensive range of indication operable by said heat responsive means and visible from the same side of the device.

6. In a device for indicating the heat condition within an automotive radiator, the combination of a heat responsive means and a plurality of indicating devices each of a different character and of substantially coextensive range of indication operable by said heat responsive means and visible from the same side of the device.

7. In a device for indicating the heat condition within an automotive radiator, a plurality of indicating devices of substantially coextensive range of indication visible from the same side of the device and mechanically operable by means responsive to changes in heat condition within said radiator.

8. In a device for indicating the heat condition within an automotive radiator, a plurality of indicating devices of substantially coextensive range of indication visible from the same side of the device and mechanically operable by means responsive to changes in heat condition within the space above the cooling fluid within said radiator.

9. In a device for indicating the heat condition within an automotive radiator, a device responsive to changes in heat condition within said radiator, a rack member operable thereby, an indicating device mounted directly upon said rack member, and an indicating device operable by said rack.

10. In a device for indicating the heat condition within an automotive radiator, a device responsive to changes in heat condition within said radiator, a member operable thereby, an indicating device operable by said member and an indicating device comprising a plurality of colored areas mounted on said member.

11. In a device for indicating the heat condition within an automotive radiator, a device responsive to changes in heat condition within said radiator, a member operable thereby, an indicating device operable by said member and an indicating device comprising a plurality of light penetratable areas of different colors mounted on said member.

12. In a device for indicating the heat condition within an automotive radiator, a dial provided with an aperture, a device for indicating the heat condition within said radiator readable against said dial, and an indicating device for indicating the heat condition within said radiator readable thru said aperture.

13. In a device for indicating the heat condition within an automotive radiator, a dial provided with an aperture, a device for indicating the heat condition within said radiator readable against said dial, an indicting device for indicting the heat condition within said radiator readable thru said aperture, and a common operating means for both indicating devices.

In testimony whereof I have affixed my signature to this specification.

HARRISON H. BOYCE.